United States Patent

[11] 3,632,240

[72] Inventor Wilhelm Dworak
Stuttgart-Vaihingen, Germany
[21] Appl. No. 877,882
[22] Filed Nov. 19, 1969
[45] Patented Jan. 4, 1972
[73] Assignee Robert Bosch GmbH
Stuttgart, Germany
[32] Priority Nov. 22, 1968
[33] Germany
[31] P 18 10 314.5

[54] WEAR-REDUCING ARRANGEMENT FOR HYDRAULIC GEAR APPARATUS
12 Claims, 6 Drawing Figs.
[52] U.S. Cl. .................................................. 418/131, 418/135, 418/179
[51] Int. Cl. .................................................. F01c 19/08, F03c 3/00, F04c 27/00
[50] Field of Search .................................. 418/131, 132, 135, 178, 179, 206

[56] References Cited
UNITED STATES PATENTS

| | | | |
|---|---|---|---|
| 2,400,286 | 5/1946 | Buckbee | 418/179 |
| 3,096,719 | 7/1963 | McAlvay | 418/132 |
| 3,263,620 | 8/1966 | Schofield | 418/132 |
| 3,291,053 | 12/1966 | Gordon | 418/132 |
| 3,346,176 | 10/1967 | Ezop | 418/179 |

Primary Examiner—William L. Freeh
Assistant Examiner—John J. Vrablik
Attorney—Michael S. Striker ABSTRACT: Wear-resistant annular discs in recesses of bearing bushings supporting the gears of a gear pump or gear motor, have an outer diameter not greater than the root circle of the gears so that the surfaces of the bearing bushings within the root circles, which are subjected to greater wear than the surface portions engaging the sides of the teeth, are protected.

INVENTOR
Wilhelm DWORAK
BY
his ATTORNEY

INVENTOR
Wilhelm DWORAK
BY his ATTORNEY

WEAR-REDUCING ARRANGEMENT FOR HYDRAULIC GEAR APPARATUS

BACKGROUND OF THE INVENTION

Gear pumps and motors are known in which between the lateral faces of the gears, and the corresponding confronting surfaces of bearing bushings wear discs are disposed whose outer diameter is equal to the outside diameter of the gears, and to the greatest diameter of the bearing bushings. Pistons in pressure chambers urge the bearing bushings with the wear discs into sealing contact with the lateral faces of the gears, including the lateral faces of the teeth.

If the wear discs would be uniformly worn off along the entire surface thereof which is in contact with the gears and teeth of the same, the discs and the bearing bushings could be continuously advanced in axial direction toward the lateral faces of the gears so that the pump would remain fluidtight. In practical use, however, it has been found that the wear of the wear discs is not uniform when a soiled pressure medium is used in the gear pump or motor. In the region between the root circles of the gears and the journals of the same, there is a substantially greater wear of the wear discs and of the lateral faces of the gears than in the region of the gear teeth. The gear pumps or motors according to the prior art have the disadvantage that the lateral surface portions of the gears and of the wear discs within the root circle are eroded and pitted so that the liquid can flow from the pressure side to the suction side of the gear pump so that the efficiency and output of the gear pump is substantially reduced.

SUMMARY OF THE INVENTION

It is one object of the invention to overcome this disadvantage of known hydraulic gear apparatus, such as gear pumps and gear motors, and to achieve uniform wear of sealing surfaces of the apparatus.

Another object of the invention is to prevent erosion and pitting of lateral surfaces of bearing bushings in contact with lateral surface of the gears of a gear pump or gear motor.

Another object is to compensate the lesser wear between the sides of gear teeth and a sealing surface as compared with the wear of the center portion of the sealing surface within the root circle.

In accordance with the invention, the surfaces of bearing bushings adjacent the lateral faces of the gears of a gear pump or motor, are provided with concentric recesses adjacent each bearing bore, and extending between the root circle of the gears to their respective bearing bores, and in each recess, an annular wear disc is inserted whose outer diameter is not greater than the root circle.

The arrangement of the invention has the advantage that the gear pump or motor remains sealed for a long period of use, even if liquids are transported which are soiled with foreign bodies. The increased wear, which particularly occurs in the region between the root circle of the gears and the journals of the gears, is compensated by the wear discs of the present invention, since the same can be biassed to move toward the respective gears relative to the respective bearing bushing, while the sides of the teeth remain in sliding engagement with the outer annular portion of the sealing surface of the bearing body.

A wear reducing arrangement for hydraulic gear apparatus, such as a gear pump or a gear motor, comprises, in accordance with an embodiment of the invention, a casing; first and second meshing gears located in the casing and having aligned journal portions, respectively, each gear having teeth between a root circle and an outside circle and two annular lateral faces between the journal portions and the root circle; first and second pairs of bearing bushings mounted in the casing, the bearing bushings of the first and second pairs having aligned bearing bores, respectively, supporting the journal portions for rotation about first and second axes, respectively, the bearing bushings of each pair having confronting surfaces in contact with said teeth and having an outer diameter equal to the diameter of the outside circle, each of the surfaces being formed with a central annular recess; and an annular wear disc in each recess having an outer diameter substantially equal to the diameter of the root circle and being in sliding contact with the respective adjacent lateral face of the respective gear. The greater wear within the root circle is compensated by the wear discs.

Preferably, each recess has an outer diameter which is not greater than the diameter of the root circle, and the lateral faces, surfaces and recesses are circular and annular.

In the preferred embodiments of the invention, elastic means are provided in each recess for biassing the respective wear disc toward and into sliding engagement with the respective lateral face of the respective gear.

The elastic means is preferably an elastic sealing ring disposed in the recess between the wear disc and the surface of the bearing bushing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
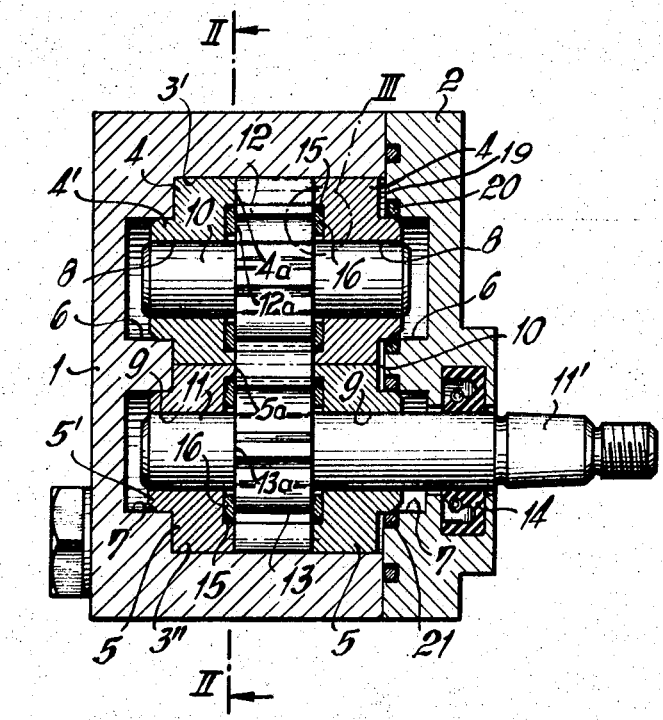
FIG. 1 is an axial sectional view of a gear pump according to the invention.
Figure 2:
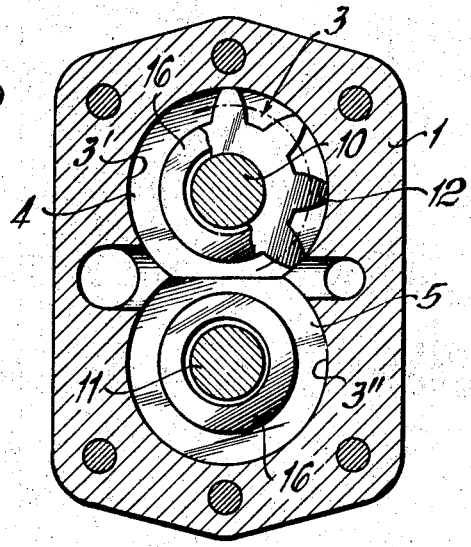
FIG. 2 is a cross-sectional view taken on line II—II in FIG. 1.

FIGS. 1 and 2 illustrate the general arrangement of a gear pump in accordance with the invention, and it will be understood that in the area indicated by a circle III in FIG. 1, any of the modified embodiments illustrated in FIGS. 3 to 6, may be provided.

The gear pump shown in FIGS. 1 and 2 has a casing 1 closed by a cover 2. An annular sealing rope in an annular groove of the cover 2, seals the engagement faces of the main casing portion with the cover 2. The interior 3 of the casing 1 is mainly formed by two intersecting bores 3' and 3". In each cylindrical bore, a pair of bearing bushings 4 and 5, respectively, is disposed in such a manner as to be axially movable. Cylindrical projections 4' and 5,' respectively, on the ends the bearing bushings remote from the gears 12, 13 are mounted in corresponding bores 6 and 7 of casing portion 1 and cover portion 2. Chambers remaining at the ends of bores 6 and 7 are connected by ducts, not shown, with the suction inlet of the gear pump.

Bearing bushings 4 and 5 have bearing bores 8 and 9 in which journals 10 and 11 of two meshing spur gears 12 and 13 are mounted for rotation. One of the journal portions projects through an opening in cover 2 to the outside and has a frustoconical seat 11' to which a drive wheel can be attached. The opening in cover 2 through which the extension of journal 11 passes, is sealed by a sealing ring 14.

Figure 3:
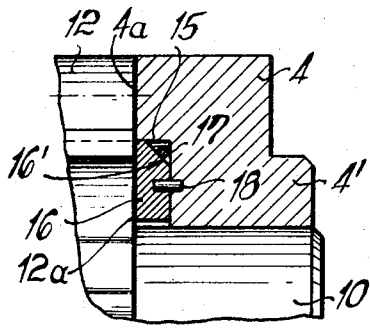
FIG. 3 is a fragmentary sectional view illustrating a portion of FIG. 1 surrounded by the circle III on an enlarged scale.
Figure 4:
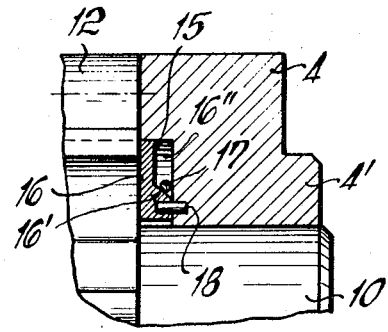
FIG. 4 is a fragmentary sectional view corresponding to FIG. 3 but illustrating a modification of a wear disc.
Figure 5:
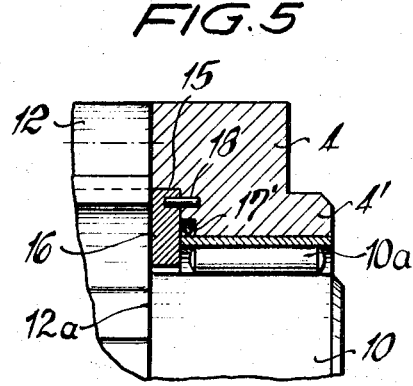
FIG. 5 is a fragmentary sectional view corresponding to FIG. 3, and illustrating another modified construction of the wear disc.

The bearing bushings 4 and 5 have confronting surfaces 4a and 5a formed with circular annular recesses 15 whose outer diameters are substantially equal to the root circle of the gears so that the annular portions of surfaces 4a and 5a which are in contact with the sides of the teeth of gears 12 and 13 extend between the root circle of the teeth and the outside circle of the same. An annular circular wear disc 16 and an elastic sealing ring 17 are located in each recess 15. In the embodiment of FIGS. 3, 4 and 5, a guide pin 18 is fixedly secured to each bearing body and projects into a hole of the wear disc 16 to prevent rotation of the same relative to the bearing bushing 4 or 5, while guiding the respective wear disc 16 for axial movement into engagement with the lateral face 12a or 13a of the respective bearing bushing. Rotation of the wear discs in the recesses 15 must be prevented since otherwise the sealing rings 17 or 17' would be destroyed.

In the embodiment shown in FIG. 3, the wear disc 16 has a frustoconical face 16'. A circular sealing ring 17 surrounds the frustoconical surface 16' and is pretensioned to urge wear disc 16 in axial direction into slidable engagement with the lateral face 12a of the respective gear. During the axial movement, the wear disc 16 slides on the guide pin 18 which is disposed so that the outer peripheral surface of wear disc 16 abuts the circular surface of recess 15. The slant of the frustoconical surface 16' is preferably 45°. A small gap remains between the inner circular surface of wear disc 16 and the respective journal 10.

In the embodiment illustrated in FIG. 4, the greatest diameter of the frustoconical surface 16' is less than the outer diameter of the wear disc 16, so that a chamber 16'' is formed in the recess which is connected by a duct, not shown, with a pressure chamber of the pump so that an additional force urges wear disc 16 into sliding engagement with lateral face 12a of the respective gear 12.

In the embodiment of FIG. 5, the wear disc 16 has a rectangular cross section matching the cross section of the recess 15, and a circular groove in the bottom of recess 15 receives a compressed elastic sealing ring 17' which urges wear disc 16 toward the lateral face 12a of the respective gear 12. Journal 10 is mounted in a roller bearing 10a, which is sealed by sealing ring 17'.

Figure 6:
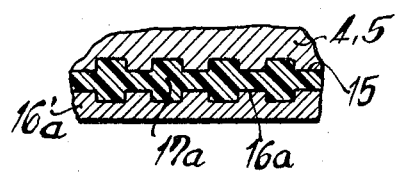
FIG. 6 is a fragmentary developed sectional view taken in circumferential direction of a gear, and illustrating a further modified construction.

In some cases, it is preferred to omit the guide pin 18, and to prevent turning of the wear disc 16 by its shape. As shown in FIG. 6, a circumferential row of projections and recesses 16a is provided in a wear disc 16' and the bottom of recess 15 is provided with corresponding circumferentially spaced projections and recesses. The sealing ring 17a is profiled to fit into the recesses of the wear disc 16' and of recess 15 in bearing bushings 4 or 5 so that the wear disc 16' cannot turn relative to the bearing bushing. When the gear pump is assembled, sealing ring 17a is compressed in axial direction, so that wear disc 16' is urged toward the lateral face of the respective gear.

Wear disc 16 or 16' is preferably constructed of steel with a coating of a synthetic material, for example polytetrafluoroethylene, or made of aluminum or a nitrified steel.

It is evident that the invention can also be applied to gear pumps and motors whose casing includes three plates. In such a construction, the recesses 15 are directly provided in the plates on opposite sides of the lateral faces of the gears within the root circle.

The invention can also be applied to hydraulic gear apparatus comprising an inner gear and a pinion.

As shown in FIG. 1, a small chamber 19 is formed by shoulders of bearing bushings 4 and 5 and a cover 2. Pressure chamber 19 is connected by a duct, not shown, with a pressure chamber of the gear pump. Annular sealing ropes 20 and 21 seal chamber 19.

During operation of the apparatus as pump or motor, the pressure in pressure chamber 19 urges the bearing bushings 4 and 5 to the left as viewed in FIG. 1, so that annular surfaces 4a, 5a abut the sides of the gear teeth between the root circle and the outside circle. The wear discs 16 abut the lateral faces of the gears between the root circle and the journals 10 and 11, respectively. If the pump transports a soiled liquid, the dirt particles increase the friction and wear of the contracting surfaces of the metal parts substantially, and the dirt particles have the effect of a grind wheel so that the wear is great. However, in the region of the teeth such wear is not great since the edges of the sides of the teeth have the effect of strippers which remove the dirt particles from the outer surface portions 4a and 5a. The wear in this region is compensated by the movement of the bearing brushings toward the gears caused by the pressure in pressure chamber 19.

In the inner zone between the root circle and the journals of the gears, the wear is substantially greater since leakage of oil flowing to the bearing bores carries dirt particles into the region where the particles are embedded in the respective surfaces and have an abrading effect causing deep pitting and erosion. However, the wear discs 16, biassed by the elastic means 17, follow up so that the group remains sealed. The pressure required for maintaining the wear disc 16 in sliding engagement with the worn off lateral faces 12a and 13a of the gears is not substantial, and can be provided by the tensioned sealing rings 17 or 17'. In the embodiments of FIGS. 3 and 4, the pretensioned sealing ring 17 tending to contract, acts on the frustoconical surface 16' or 16'' to press wear disc 16 in axial direction into engagement with the worn off lateral face 12a. In the embodiments of FIGS. 5 and 6, the sealing rings 17' and 17a are compressed in axial direction during assembly and resiliently press the wear discs 16 or 16' into engagement with the lateral faces 12a or 13a.

It will be understood that each of the elements described above, or two or more together, may also find a useful application in other types of hydraulic gear apparatus differing from the types described above.

While the invention has been illustrated and described as embodied in a gear pump having annular wear discs whose outer diameter is not greater than the root circle of the gears, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Wear-reducing arrangement for hydraulic gear apparatus, comprising, in combination, a casing; first and second meshing gears located in said casing and having aligned journal portions, respectively, each gear having teeth between a root circle and an outside circle and two annular lateral faces between said journal portions and said root circle; first and second pairs of bearing bushings mounted in said casing, the bearing bushings of said first and second pairs having aligned bearing bores, respectively, supporting said journal portions for rotation about first and second axes, respectively, the bearing bushings of each pair having confronting surfaces in contact with said teeth having an outer diameter equal to the diameter of said outside circle, each of said surfaces being formed with a central annular recess; and an annular wear disc in each recess having an outer diameter substantially equal to the diameter of said root circle and being in sliding engagement with the respective adjacent lateral face of the respective gear.

2. An arrangement as claimed in claim 1 comprising elastic means in each recess biassing the respective wear disc toward and into sliding engagement with the respective lateral face of the respective gear.

3. An arrangement as claimed in claim 1 wherein each recess has an outer diameter not greater than said diameter of said root circle and opens into the respective bearing bore.

4. An arrangement as claimed in claim 1 wherein each bearing body is formed with an annular groove in the bottom face of the respective recess; and comprising an elastic annular pretensioned sealing ring located in said groove and biassing the respective wear disc toward the respective lateral face of the respective gear.

5. An arrangement as claimed in claim 1 wherein each wear disc has a circumferentially extending row of spaced projections on the side remote from the respective gear; wherein each recess has an annular bottom face formed with spaced projections located opposite said projections; and comprising a pretensioned sealing ring between said first and second projections having recesses receiving the same so that said sealing ring, said wear disc, and said bearing bushing cannot turn relative to each other.

6. An arrangement as claimed in claim 1 comprising means mounting each wear disc in the respective recess nonrotatable and movable in axial direction toward and into sliding engagement with the respective lateral face of the respective gear.

7. An arrangement as claimed in claim 6 comprising means for biassing the respective wear disc toward and into sliding engagement with the respective lateral face of the respective gear.

8. An arrangement as claimed in claim 1 comprising elastic means in each recess for urging the respective wear disc in axial direction toward and into sliding engagement with the respective lateral face of the respective gear; and means mounting said wear disc in said recess nonrotatable and movable in axial direction.

9. An arrangement as claimed in claim 8 wherein said elastic means is an elastic sealing ring disposed in said recess between said wear disc and the bottom of said recess.

10. An arrangement as claimed in claim 9 wherein said mounting means includes an axially extending pin in each recess secured to the respective bearing bushing and slidingly engaging an axial bore in the respective wear disc.

11. An arrangement as claimed in claim 1 wherein each wear disc has on the side remote from the respective gear a frustoconical surface; and comprising an annular elastic pretensioned sealing ring surrounding and resiliently abutting said frustoconical surface of each wear disc for urging the respective wear disc into sliding engagement with the respective lateral face of the respective gear, while sealing the respective bearing bore.

12. An arrangement as claimed in claim 11 wherein each wear disc forms in the respective recess a pressure chamber partly bounded by said frustoconical surface; and wherein the greatest diameter of said frustoconical surface is less than the outer diameter of said disc.

* * * * *